(12) United States Patent
Pawlikowska et al.

(10) Patent No.: US 12,136,152 B2
(45) Date of Patent: Nov. 5, 2024

(54) SYSTEM AND METHOD FOR RENDERING A DESIGN INCLUDING A DYNAMIC DESIGN ELEMENT

(71) Applicant: Canva Pty Ltd, Surry Hills (AU)

(72) Inventors: Karolina Pawlikowska, Sydney (AU); Andrew Charles Bennett, Sydney (AU); Max Scheffler, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 116 days.

(21) Appl. No.: 17/797,645

(22) PCT Filed: Feb. 6, 2020

(86) PCT No.: PCT/AU2020/050099
§ 371 (c)(1),
(2) Date: Aug. 4, 2022

(87) PCT Pub. No.: WO2021/155420
PCT Pub. Date: Aug. 12, 2021

(65) Prior Publication Data
US 2023/0056599 A1    Feb. 23, 2023

(51) Int. Cl.
*G06T 11/60* (2006.01)
*G06F 3/14* (2006.01)
*G06T 11/00* (2006.01)
*G06T 11/40* (2006.01)
*G06T 13/00* (2011.01)
(Continued)

(52) U.S. Cl.
CPC ............. *G06T 11/60* (2013.01); *G06T 11/001* (2013.01); *G06T 11/40* (2013.01); *G06T 13/00* (2013.01); *G06T 2210/62* (2013.01)

(58) Field of Classification Search
CPC ........ G06T 11/001; G06T 11/60; G06T 11/40; G06T 11/20; G06T 13/00; G06T 2210/62; G06T 9/00; G09G 5/377; G09G 5/397; G09G 5/14; G09G 5/38; G09G 2340/0435; G09G 2340/12; G09G 2340/02; G09G 2340/125; G09G 2340/0464; G09G 2320/0613; G09G 2370/20; G06F 3/147; H04N 1/41; H04N 1/64; H04N 19/70; H04N 19/187; H04N 19/597;
(Continued)

(56) References Cited
U.S. PATENT DOCUMENTS

| | | | | |
|---|---|---|---|---|
| 6,734,873 B1 * | 5/2004 | Herf | ................ | G06T 15/40 345/545 |
| 11,669,863 B1 * | 6/2023 | Greer | ................ | H04L 41/22 705/14.54 |

(Continued)

OTHER PUBLICATIONS

Written Opinion for International Search Report mailed Apr. 9, 2020 for PCT/AU2020/050099.

*Primary Examiner* — Wesner Sajous
(74) *Attorney, Agent, or Firm* — GrowIP Law Group LLC

(57) ABSTRACT

A computer implemented method for rendering a page that includes one or more dynamic design elements into an output video is described. The method comprises processing the page to generate one or more layers, each layer being either a static layer associated with one or more static design elements of the page or a dynamic layer associated with a single dynamic design element of the page. Output frames are then generated using the layers and then encoded into the output video.

20 Claims, 6 Drawing Sheets

(51) Int. Cl.
   *G09G 5/14*   (2006.01)
   *G09G 5/37*   (2006.01)
   *G09G 5/38*   (2006.01)
   *G09G 5/39*   (2006.01)

(58) Field of Classification Search
   CPC .... H04N 19/127; H04N 19/30; H04N 19/159; H04N 19/119; H04N 19/124; H04N 19/46
   See application file for complete search history.

(56) References Cited

U.S. PATENT DOCUMENTS

| | | | |
|---|---|---|---|
| 2004/0189669 A1* | 9/2004 | David | G06F 9/451 345/949 |
| 2007/0057943 A1* | 3/2007 | Beda | G06T 1/20 345/419 |
| 2008/0077862 A1 | 3/2008 | Tolpin | |
| 2009/0228782 A1* | 9/2009 | Fraser | G06F 16/9577 715/234 |
| 2018/0374122 A1* | 12/2018 | Greer | G06F 40/186 |
| 2020/0035206 A1 | 1/2020 | Hamaker et al. | |
| 2020/0184517 A1* | 6/2020 | Greer | G06F 16/50 |
| 2023/0056599 A1* | 2/2023 | Pawlikowska | G06T 11/60 |

* cited by examiner

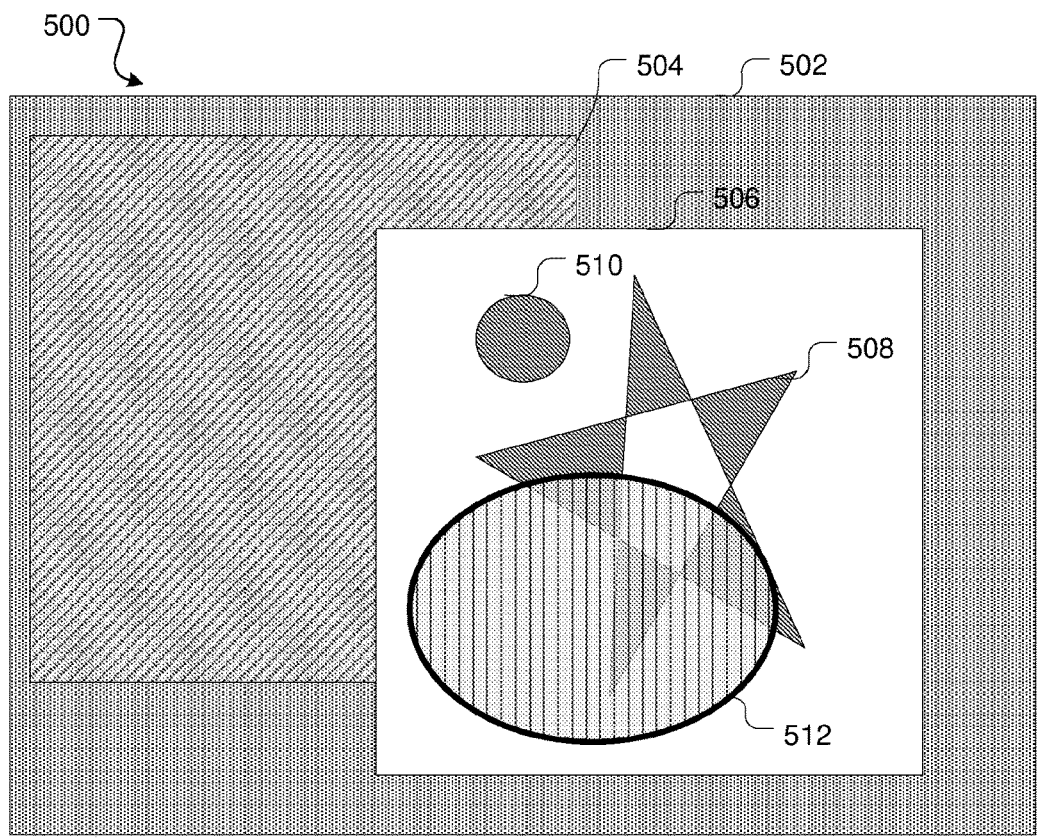
Fig. 5
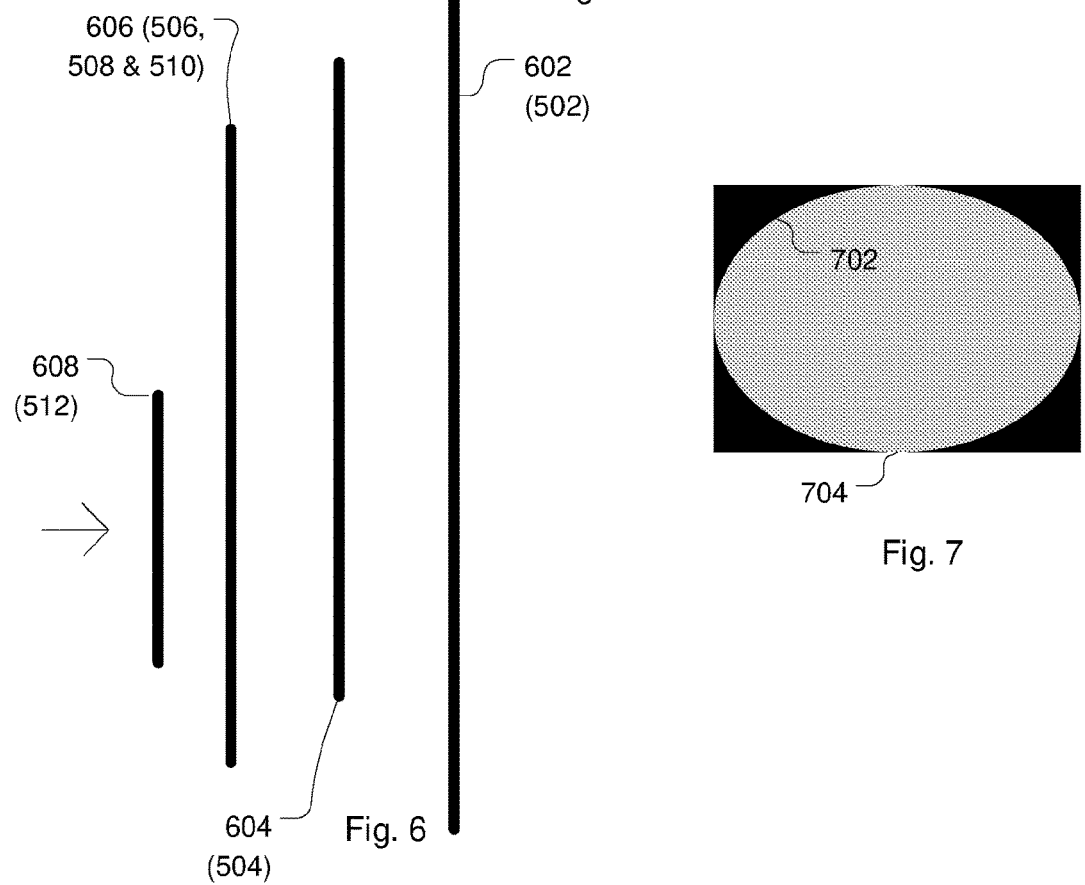
Fig. 6
Fig. 7

SYSTEM AND METHOD FOR RENDERING A DESIGN INCLUDING A DYNAMIC DESIGN ELEMENT

CROSS-REFERENCE TO RELATED APPLICATION

This application is a U.S. National Stage Application that claims the benefit of the filing date of International PCT Application No. PCT/AU2020/050099, filed on Feb. 6, 2020, that is hereby incorporated by reference in its entirety.

FIELD OF THE INVENTION

The present disclosure is directed to rendering designs, specifically rendering designs that include one or more dynamic design elements.

BACKGROUND OF THE INVENTION

Many tools exist which provide functionality for creating and publishing designs. One example is the tool provided by Canva Pty Ltd.

In the context of the present specification, designs can be either static or dynamic. A static design does not change over time, while a dynamic design does. Dynamic designs include one or more dynamic design elements, for example, animations or videos.

When a dynamic design is created, particularly one that includes one or more video design elements, there is processing that necessarily occurs. This processing can be intensive in terms of both processor usage and memory usage as videos in particular are resource intensive.

For example, a design may include multiple dynamic design elements such as videos and processing multiple videos in order to render the design may take a long period of time and/or utilise a significant amount of computing resources that could otherwise be used for other processes. This may cause a user to notice a slowdown or other indicator of heavy resource usage.

Background information described in this specification is background information known to the inventors. Reference to this information as background information is not an acknowledgment or suggestion that this background information is prior art or is common general knowledge to a person of ordinary skill in the art.

SUMMARY OF THE INVENTION

Described herein is a computer implemented method for rendering a page into an output video, the page comprising a plurality of design elements, each design element being a static design element or a dynamic design element, the method comprising: processing the page to generate one or more layers, each layer being either a static layer associated with one or more static design elements of the page or a dynamic layer associated with a single dynamic design element of the page; generating a plurality of output frames using the one or more layers; and encoding the plurality of output frames into the output video.

BRIEF DESCRIPTION OF THE DRAWINGS

In the drawings:

FIG. 5 is an example design document.

FIG. 6 is a profile view of the layers corresponding to the design document of FIG. 5.

FIG. 7 is an example use of an alpha mask for a dynamic design element.

Figure 1:
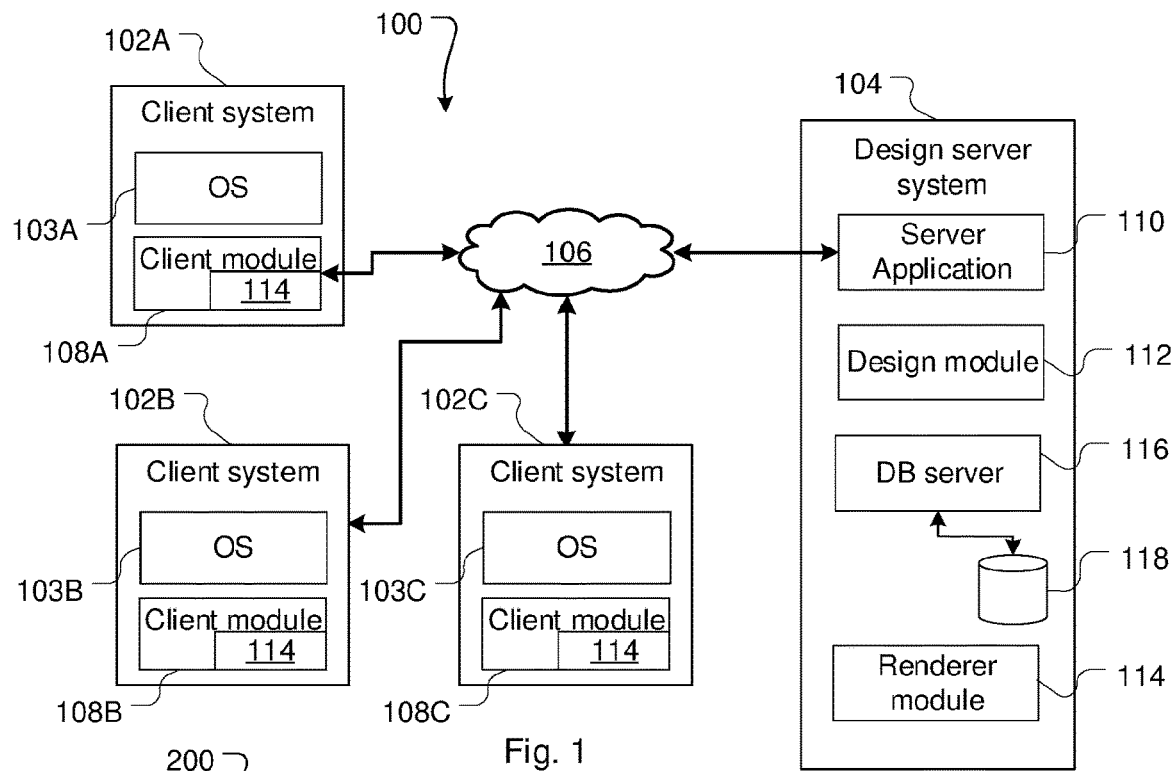
FIG. 1 is a block diagram illustrating an example environment in which features of the present disclosure can be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described previously, designs in the present disclosure may include static design elements and dynamic design elements. Rendering designs that include one or more dynamic elements can be computer resource intensive In certain embodiments described herein, the rendering process described makes use of specific graphics processing hardware to perform certain operations. As used herein graphics processing hardware should be understood to be distinct from general processing hardware (e.g. a CPU or the like). By way of example, specific graphics processing hardware may be GPU of a computer processing device. As a further example, specific graphics processing hardware may be graphics card of a computer processing device (the graphics card including a GPU and/or other graphics processing chips/components).

In other embodiments, however, the rendering process (or features thereof) could be implemented by general processing hardware (e.g. a CPU) of a device.

Furthermore, in certain embodiments the rendering process is implemented by a mobile device (and makes use of specific graphics processing hardware to perform certain operations). In the context of the present specification, a mobile computing device is one with relatively limited computing resources (such as memory and processing power) and relatively limited ability for an end user to change those computing resources. Examples of mobile computing devices include smart phones and tablets. In contrast, a non-mobile computing device is a computing device with more powerful computing resources and/or the ability for end users to change those computing resources.

Examples of non-mobile computing devices in this context include desktop computers, laptop computers, and server computers, Generally speaking, rendering a design with only static elements is a relatively simple and computationally inexpensive process. Rendering designs with dynamic elements, however, is considerably more complex—with complexity increasing as the number of dynamic elements increases. As is always the case with computationally complex tasks, one approach is to simply utilise more (and/or more powerful) computing resources—e.g. faster processing units and more memory. This may be possible where the computer system being used is a non-mobile computing device—e.g. a server, desktop or other device which has or can be provided with higher end computing resources—though utilising higher end resources does not provide a particularly efficient solution. For other types of devices—e.g. mobile devices—simply accessing/providing more powerful computing resources may not be an option. In this case, efficient or more effective use of available computing resources in order to render dynamic designs can provide significant advantages. For example, it may allow the mobile device to render a design that it simply could not otherwise render. Alternatively (or in addition) it may allow the mobile device to render the design in a way that is faster and/or requires less resources, thus freeing resources for other processes being performed by the mobile device at the same time.

Embodiments of the present disclosure address these issues. In particular, embodiments of the present disclosure separate the design elements into static and dynamic layers for the purpose of rendering a design efficiently. A static layer may have multiple static design elements. A dynamic layer has one dynamic element.

In the described embodiment, a renderer module is provided to render designs. The renderer module may be configured to analyse a design and determine which design elements can be separated into corresponding layers based on the nature of the element in question (e.g. static or dynamic) and depth information associated with the design elements. Once the layers have been determined, the renderer module can render the design by taking "snapshots" (also referred to as output frames) of the input frames in the input dynamic elements in the design. The snapshots capture the output frames changing over time and together can be encoded into an output rendering (e.g. a video). In this manner, the renderer module can efficiently render many different types of designs of varying complexities.

Terminology

For ease of reference, the following is an explanation of certain terms used in this disclosure.

Design Document

A design document (also simply referred to as a "document" in this disclosure) is a term to refer to the design as a whole. A document may have metadata about the document such as type and dimensions: e.g. a document height and width. A document includes one or more pages.

Page

A page is a section of the design document (similar conceptually to a page in a book) that shares some or all of the same metadata as the document. For example a document may have multiple pages that are the same type and have the same dimensions. Pages of a given document may, however, have different dimensions.

Design Creation Interface

A design creation interface is an interface for constructing design content in a document. The design creation interface enables users to select and place design elements on to a page of the document.

Design Elements

Design elements are components of a design that can be added to and positioned in three dimensional space on a document page (e.g. in the horizontal, vertical, and depth dimensions). Some design elements also permit other operations, such as editing (e.g. changing colours or filtering), orientation (including flipping or rotating), and scaling (e.g. enlarged or shrunk), Design elements include dynamic and static elements. Static in the context of this disclosure means that a design element does not change over time in the design as rendered (or published). Examples of static elements include text and static images or graphics (e.g. static photographs, vector graphics, or other graphics).

In contrast, a design element that is dynamic does change over time in the design as rendered. Changes can be any form of change such as a single pixel that changes colour over time. A change typically involves transition between two or more frames of the design element. Examples of dynamic elements include videos, animations, and some image file formats, such as gif, that allow for non-static images.

A design element can be associated with element metadata. Design element metadata can include data such as a resource identifier identifying a resource the element represents (e.g. Mxxxxxxxxxx for an image (static) resource or Vxxxxxxxxxx for a video (dynamic) resource, a name, and an element type. When placed on a page, the design element can be also associated with metadata indicating, for example, the x-y position on the page, a rotation factor, or scale factor.

A dynamic design element may have metadata defining trim points. A trim point is a timestamp associated with a dynamic element that represents a beginning (for a start trim point) or end (for an end trim point) of playback of the dynamic element. Typically, a pair of start and end trim points define a playback section of a dynamic design element that the user wishes to render in the design. In some embodiments, by default, input dynamic elements are not trimmed. Accordingly, operations performed in relation to trim points may only be required if an input dynamic element has associated trim points. Where only a start trim point is defined the dynamic element is rendered from the start trim point to the end of the dynamic element. Alternatively, where only an end trim point is defined the dynamic element is rendered from the beginning to the end trim point. Trim points can often be created and/or modified by the user in the design creation interface.

Dynamic design elements may also have metadata associated with audio playback—for example a volume value between 0 and ∞.

Position of Design Elements

Each design element can be placed and positioned on a page, for example via a drag and drop mechanism using a mouse or by touch on a touch sensitive screen. This position can be recorded, for example, by coordinates in two-dimensional space (referred to as x-y coordinates).

Depth of Design Elements

Each design element is also associated with a third dimension: depth. Depth is used for the purpose of determining whether a design element is partly hidden or occluded by another design element.

Depth information in respect of design elements can be captured/recorded in various ways. In this disclosure depth is associated with an index (referred to as the z-index) rather than a coordinate dimension as actual depth in coordinate space is not necessary. Rather, it is important to be able to determine which design elements are placed on top of, and therefore may partially or completely obscure, any design elements below.

To maintain depth information the present disclosure stores element data for elements added to a page in an ordered data structure (e.g. a list or queue of page elements). As elements are added to a page they are added to the end of the data structure. In this case the order of the element data structure allows depth information to be implicitly maintained as an element's position in data structure (e.g. a list) can be considered its z-index: the element at index position 0 is the furthest away/deepest element of the page.

Design creation interfaces will generally operate such that absent user commands to the contrary, elements are added to a page in rearmost to foremost depth order—e.g. the first element of a page (typically a background element) will be recorded in the first element of the page's element list—i.e. index (depth)=0, the rearmost depth. The next element added will be added to the end of the element list—i.e. index (depth)=1, the following element to the new end of the element list—i.e. index (depth)=2 and so forth. Any element stored at a list location having a higher index could therefore (depending on position and dimensions) partly or wholly occlude elements stored at locations with a lower index. Via the design creation interface a user may change the depth order of the design elements once they have been placed on the page. This may be performed by such commands as 'bring forward', 'send backwards', 'send to back' or 'bring to front'. Such changes cause corresponding changes to the order of the elements in a page's element list.

Layers

As used herein, a layer is a grouping of one or more design elements. As with the design elements themselves, each layer is associated with depth information (e.g. an index) defining a depth-order of all layers. Once elements have been assigned to a layer each design element in a given layer is (for the purposes of rendering) treated as having the same depth as the depth of the layer. As described below, where a single layer has multiple static elements with different element depths, these elements are flattened into the layer in a way that addresses any occlusions created by the static element depths.

Within a layer, a design element's associated position information (e.g. size, orientation, coordinates) remain the same.

As with design elements, a layer can be referred to as static or dynamic. A static layer is a layer with one or more static design elements. A dynamic layer is a layer with a dynamic design element.

A dynamic layer may be referred to as being a dynamic layer with transparency. This indicates that the dynamic element associated with the dynamic layer has transparency.

Where a design element is described as having transparency, part or all of the design element may have transparency, and the part (or whole) of the design element having transparency may be wholly or partially transparent. In other words, if a design element has any pixel with an alpha value that does not equal 1 the design element has transparency.

The layer creation process described herein can operate to group static design elements of multiple (though adjacent) depths into a single layer. Accordingly, a page may use more element depths in the design phase (i.e. while the design is being prepared) than there are layers.

Much of this disclosure is described in relation to the graphic-design tool made available by Canva. The techniques and features described here can, however, be applied to other tools allowing for the creation and rendering/publication of graphic designs.

Networked Environment

FIG. 1 depicts one example of a networked environment 100 in which the various operations and techniques described herein can be performed.

Networked environment 100 includes client systems 102A, 102B, 102C and a design server system 104.

Each client system 102A, 102B, 102C hosts a respective client module 108A, 108B, 108C, which, when executed by the client system configures the client system 102A, 102B, 102C to provide client-side functionality/interact with the design server system 104 (or, more specifically, a server application 110 operating thereon).

A given client module 108A, 108B, 108C may be a specific application (as opposed to a general web browser application). In this case the client module 108 communicates with the server application 110 using defined API calls.

Alternatively, a given client module 108 may be a general web browser application (such as Chrome, Safari, Internet Explorer, Opera, or an alternative web browser application) which accesses the server application 110 via an appropriate uniform resource locator (URL) and communicates with the server application 110 via general world-wide-web protocols (e.g. http, https, ftp).

Each client system 102 also runs an operating system 103—for example iOS, Android, Windows, Linux etc.

As described above, in certain embodiments the rendering process described herein makes use of a specific graphics hardware (e.g. a graphical processing unit (GPU), a graphics card, and/or other graphics processing hardware). To do so, what will be referred to as a GPU interface is used. The GPU interface is used to specify certain operations or processes that are to be performed by the GPU of a client device (as opposed, for example, to a CPU of the client device).

By way of specific example, a given client system such as 102C may be an Android system (i.e. a mobile device running an Android operating system). In this case, where the client module 108 is a specific application the GPU interface may be the openGL application programming interface (API). As an alternative example, a given client system such as 102B may be an iOS system (e.g. a mobile device running the iOS operating system), in which case if the client module 108 is a specific application the GPU interface may be the Metal API. As a further example, where the client module 108 is a web browser application, the GPU interface may be the webGL API.

A given client system 104 may have more than one client module 108, for example both a general web browser application and a dedicated programmatic client module The client module may comprise an additional specific module (not illustrated) similar to design module 112 which handles the design construction on the client-side for communication to the server application 110

Design server system 104 hosts a server application 110. The server application 110 is executed by the design server system 104 to configure it to provide server-side functionality to one or more corresponding client modules (e.g. 108A, 108B, 108C as discussed above). The server application 110 comprises one or more application programs, libraries, APIs or other software elements that implement the features and functions that are described herein.

Design server system 104 includes additional server-side resources which are used/accessed by the server application 110 to process and respond to communications during the design and render phases. A given server side resource may be provided on the same computer processing system as the server application 110 or on a different computer processing system (and be in communication with the server application 110 via a direct or networked communication channel).

By way of example, server-side resources in the design server system 104 include a database server 116 and a datastore 118, which together provide access to data relevant to the services being offered by the server application 110.

The server application 110 may be a web server (for interacting with web browser clients) or an application server (for interacting with dedicated application clients). While single server architecture has been described herein, it will be appreciated that the design server system 104 can be implemented using alternative architectures. For example, in certain cases a clustered architecture may be used where multiple server computing instances (or nodes) are instantiated to meet system demand.

The embodiments describe herein also involve use of a renderer module 114. Generally speaking, the renderer module 114 performs operations to render a design into a preview or published design in a user-selected format (e.g. a PNG, PDF, JPEG, MP4, Animated GIF, or other format). Depending on implementation, the renderer module 114 may be a server-side module (i.e. installed on server 104) or a client-side module (i.e. installed on a client system 102). To this end, renderer module 114 has been illustrated on both client systems 112 and server system 104. While the renderer module 114 can be provided both client- and server-side, typically it will be either a client-side module (and not provided at server system 104) or a server module (and not provided at client systems 102). While the renderer module 114 has been illustrated as a separate module the functions described as being performed by it could be performed by an alternative application/module—e.g. a client module 108, server design module 112, or other application/module.

The server application 110 is referred to and shown as being part of a Design server system 104. Where the server system 104 includes multiple computer systems on which the server application 110 and resources run, those computer systems may be physically co-located and/or in different physical locations. Similarly, the computer systems on which the server application 110 and resources run may be on a common network (e.g. a local area network) or on different networks (in communication with each other via a network such as the Internet). Relevantly, the server application 110 can communicate with the resources in order to respond to communications it receives from the client systems 102A, 102B, 102C.

The client systems 102A, 102B, 102C and server application 110 communicate data between each other either directly or indirectly through one or more communications networks 106. Communications network 106 may comprise a local area network (LAN), a public network, or a combination of networks.

Client systems 102A, 102B, 102C may be any device suitable for performing client-side operations described herein for example a mobile device (e.g. a tablet, mobile phone, or other mobile device) or non-mobile device (e.g. a laptop computer desktop computer). In the example of FIG. 1, client system 102A is a desktop computer, client system 102B is an iPhone mobile device, and client system 102C is an Android mobile device.

Generally speaking, users of a client system 102 are associated with one or more user accounts and interact with the design server system 104. This interaction may include any type of user account interaction with the design server system 104, including interaction with content and/or software application(s) hosted by the design server system 104. Example interactions include accessing/viewing and/or editing one or more design documents hosted by the Design server system, creating new designs, publishing or previewing designs, etc.

Application or user operations may be performed by a client module 108, the server application 110, or by a combination of client module 108 and the server application 110. For example, application operations involving the creation of new designs may be performed by a client module 108. The data displayed, however, may be display data generated by the client module 108 itself, or generated by the server application 110 communicated to the client module 108.

Similarly, application operations involving user input involve a client system 102 receiving user input and passing that input to the client module 108. The information input may be processed by the client module 108 itself, or communicated by the client module 108 to the design server system 104 to be processed by the server application 110.

Application operations involving writing data to the data store 118 involve the database server 116. The data written to the data store 118 may, however, be communicated to the server application 110 from a client module 108.

As noted above, a client system 102 may be any computer processing system which is configured (or configurable) by hardware and/or software to offer client-side functionality. Similarly, server system 104 may be any computer processing system which is configured (or configurable) by hardware and/or software to provide server-side functionality. Other server-side resources (e.g. database server 116 and data store 118) will also be provided by/run on server system 104 or other computer processing systems. Typically server systems are more powerful (from a computer processing perspective) than client systems but this is not necessarily the case.

Finally, it should be noted that while a client server architecture has been provided by way of example, the techniques could be used in a stand-alone application, that is one that does not use a server at all.

Computer Processing System

The present invention is necessarily implemented using one or more computer processing systems.

Figure 2:
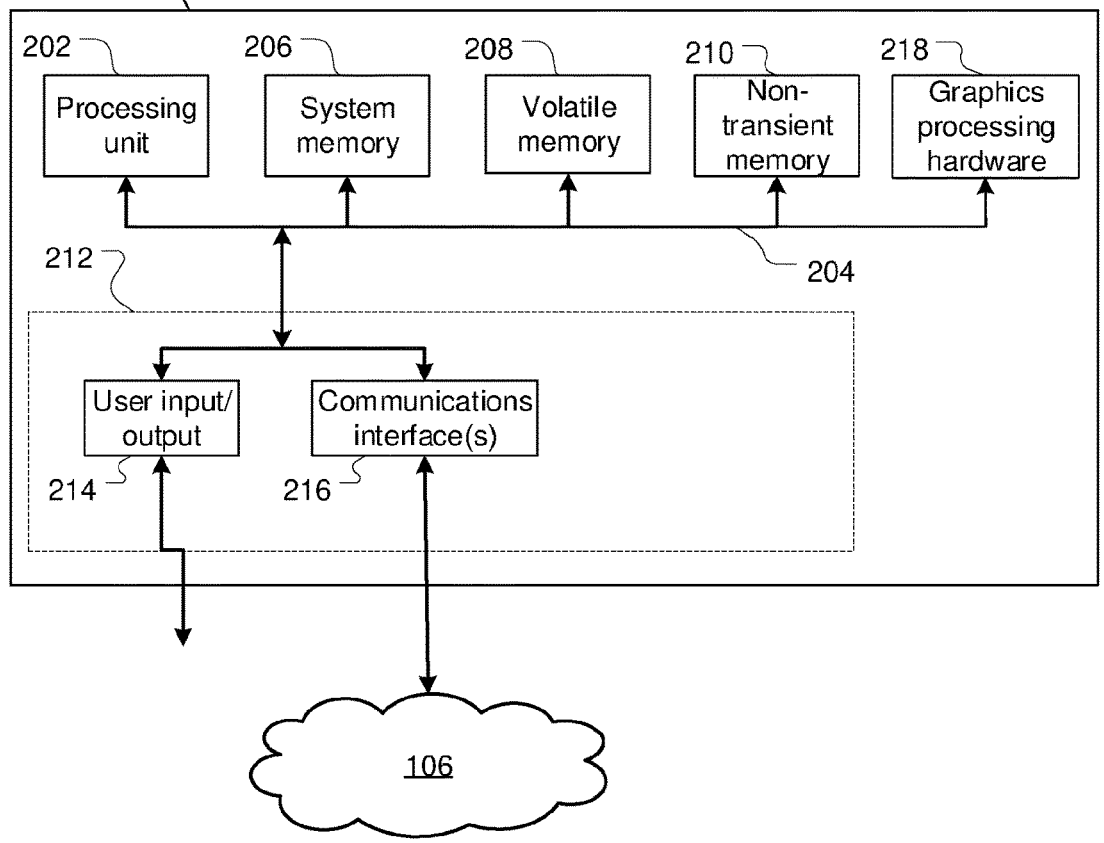
FIG. 2 is an example computer processing system.

FIG. 2 provides a block diagram of one example of a computer processing system 200. Computer processing system 200 may, for example, be configured for use as the application server 110, a client system (such as 102A, 102B, or 102C) or other server-side resource such as database server 116 or data store 118 as described above.

System 200 as illustrated in FIG. 2 is a general-purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

The computer processing system 200 includes at least one processing unit 202. The processing unit 202 may be a single computer-processing device (e.g. a central processing unit or other computational device), or may include a plurality of computer processing devices.

As described above, certain embodiments described herein make use of specific graphics processing hardware 218. By way of example, specific graphics processing hardware may be GPU. As a further example, specific graphics processing hardware may be graphics card (the graphics card including a GPU and/or other graphics processing chips/components). The specific graphics processing hardware 218 is, in certain embodiments, used to perform processes such as rendering, decoding, and encoding to improve the efficiency of/resource usage associated with rendering a design. One example of such hardware is the A13 graphics card included in Apple iPhone 11 devices.

In alternative embodiments, all processing may be performed by the processing unit 202.

Through a communications bus 204 the processing unit 202 and graphics processing hardware 218 are in data communication with each other and with one or more machine-readable storage (memory) devices that store instructions and/or data for controlling operation of the processing system 100. In this instance system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be physically integrated with system 200, or may be physically separate. Where a device is physically separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 200 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 200 connects—whether by wired or wireless means—allow data to be input into/received by system 200 for processing by the processing unit 202, and data to be output by system 200. Example devices are described below, however it will be appreciated that not all computer-processing systems will include all mentioned devices, and that additional and alternative devices to those mentioned may well be used.

For example, system 200 may include or connect to one or more input devices by which information/data is input into (received by) system 200. Such input devices may include physical buttons, alphanumeric input devices (e.g. keyboards), pointing devices (e.g. mice, track pads and the like), touchscreens, touchscreen displays, microphones, accelerometers, proximity sensors, GPS devices and the like. System 200 may also include or connect to one or more output devices controlled by system 100 to output information. Such output devices may include devices such as indicators (e.g. LED, LCD or other lights), displays (e.g. CRT displays, LCD displays, LED displays, plasma displays, touch screen displays), audio output devices such as speakers, vibration modules, and other output devices. System 200 may also include or connect to devices which may act as both input and output devices, for example memory devices (hard drives, solid state drives, disk drives, compact flash cards, SD cards and the like) which system 200 can read data from and/or write data to, and touch-screen displays which can both display (output) data and receive touch signals (input).

System 200 may also connect to communications networks (e.g. the Internet, a local area network, a wide area network, a personal hotspot etc.) to communicate data to and receive data from networked devices, which may themselves be other computer processing systems.

It will be appreciated that system 200 may be any suitable computer processing system such as, by way of non-limiting example, a desktop computer, a laptop computer, a netbook computer, tablet computer, a smart phone, a Personal Digital Assistant (PDA). Typically, system 200 will include at least user input and output devices 214 and (if the system is to be networked) a communications interface 216 for communication with a network (e.g. network 106 of FIG. 1). The number and specific types of devices which system 200 includes or connects to will depend on the particular type of system 200. For example, if system 200 is a desktop computer it will typically connect to physically separate devices such as (at least) a keyboard, a pointing device (e.g. mouse), a display device (e.g. a LCD display). Alternatively, if system 200 is a laptop computer it will typically include (in a physically integrated manner) a keyboard, pointing device, a display device, and an audio output device. Further alternatively, if system 200 is a tablet device or smartphone, it will typically include (in a physically integrated manner) a touchscreen display (providing both input means and display output means), an audio output device, and one or more physical buttons.

System 200 stores or has access to instructions and data which, when processed by the processing unit 202, configure system 200 to receive, process, and output data. Such instructions and data will typically include an operating system such as Microsoft Windows®, Apple OSX, Apple IOS, Android, Unix, or Linux.

System 200 also stores or has access to instructions and data (i.e. software) which, when processed by the processing unit 202, configure system 200 to perform various computer-implemented processes/methods in accordance with embodiments as described below. It will be appreciated that in some cases part or all of a given computer-implemented method will be performed by system 200 itself, while in other cases processing may be performed by other devices in data communication with system 200.

Instructions and data are stored on a non-transient machine-readable medium accessible to system 200. For example, instructions and data may be stored on non-transient memory 210. Instructions may be transmitted to/received by system 200 via a data signal in a transmission channel enabled (for example) by a wired or wireless network connection.

Rendering a Design

As described above, client module 108 configures a client system 102 to provide a design creation interface via which a user can create a document that comprises one or more pages, each page comprising one or more design elements. This can be referred to as the design phase and may be handled by the design module 112. Such documents can, however, also be created by other applications and imported to (or otherwise accessed by) the client module 108.

The design creation interface (or an alternative interface provided by the client module 108) also allows a user to render a document, for example, so the user can either preview how the design will appear in its final form and/or publish the design. The rendering process described herein can be performed on documents created via the client module 108 or, provided the document is in an appropriate format, documents imported to/accessed by the client module 108.

The rendering process described herein is initiated by a user issuing a render command. For example, the user can activate a render design control accessed via the design creation (or alternative) user interface to render the design. In other embodiments the user may initiate rendering a preview or publication of the design in other ways such as a command line instruction. This step triggers the rendering process which is described below with reference to FIGS. 3 and 4. Generally speaking, the rendering process involves a layer construction process 300 followed by a layer rendering process 400. Once a design is rendered, the output (e.g. a video file or the like) can be displayed, saved, shared etc.

Layer Construction Process

Figure 3:
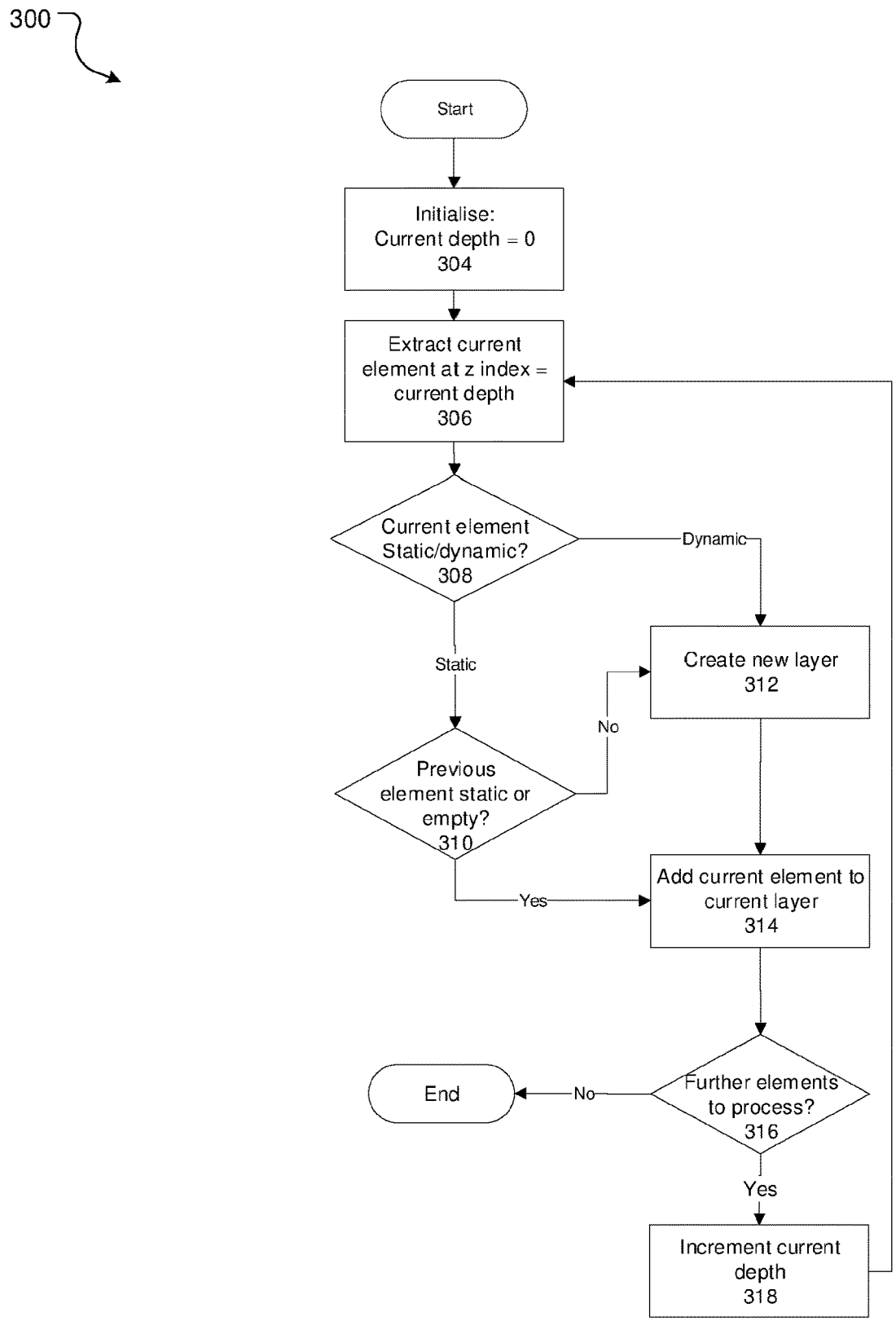
FIG. 3 is an example flowchart for creating layers.

Turning to FIG. 3, a layer construction process 300 in accordance with an embodiment will be described. In the present example, the layer construction process 300 is performed by the renderer module 114.

As described above, a document being rendered by the rendering process described herein includes one or more pages, each page having one or more design elements. Each design element has, inter alia, associated position information (e.g. size, orientation, coordinates) and depth information (e.g. a depth index).

While a document can have more than one page, each page of a document is rendered independently. Accordingly, the layer construction process 300 (and downstream rendering process 400) is performed on a per-page basis.

Generally speaking, the layer construction process involves iterating over the design elements of a page (in the present embodiment from the rearmost element to the foremost element). A new layer is created for every dynamic element encountered. Where multiple static elements are consecutive in depth order (i.e. do not have an intervening dynamic element) they are added to the same layer.

Where depth is implicitly recorded as an element's position in a page element list or the like, the layer construction process processes items of the list in index order (i.e. from index=0 to index=n–1 for a list of n items).

At 304, the renderer module 114 initialises a current depth variable to reference the rearmost possible depth (e.g. 0).

The renderer module 114 then extracts 306 the design element at the list index indicated by the current depth variable. The extracted design element becomes the current design element. On the initial processing loop the current depth will reference the rearmost design element. This will often be a background of the page—e.g. a design element that matches the dimensions of the page.

The renderer module 114 then determines 308 whether the current design element is static or dynamic. In response to determining that the current design element is dynamic, the renderer module 114 proceeds to 312.

At 312, the renderer module 114 creates a new layer. In the present context, the renderer module 114 maintains a layer list and creating a new layer involves adding a new element at the end of the layer list (in a similar manner to the way elements added to a page are added to a page element list, as described above). By adding new layers in this way each layer is associated with implicit depth information—i.e. the position of the layer in the layer list. Alternatively, the depth of a given layer may be explicitly recorded by a depth variable associated with the layer.

After creating a new layer at 312, the renderer module 114 proceeds to 314 (described below).

In response to determining that the current design element is a static design element at 308, processing continues to 310. At 310, the renderer determines whether a previous design element has been processed and, if so, whether the previous design element was static. If either of these are false, processing proceeds to 312 where the renderer module 114 creates a new layer then adds the current element to that layer (at 314).

If, at 310, the renderer module 114 determines that a previous design element has been processed and the previous element was also a static design element, processing proceeds directly to 314. In this case, the current static element is added to the same layer that the previous static element was added to.

At 314, the renderer module adds the current design element to the current layer e.g. by associating element data with the layer list element for the current layer. Where the layer already includes a (static) design element, the depth of each design element in the layer is preserved for downstream rendering of the layer. Given the renderer module is iterating through the element depths index from rearmost to foremost, then the current design element will always be in front of the previous design element. That is, if some or all of the current design element overlies the previous design element (determined by reference to element metadata such as position, orientation, scale) that part of the previous design element is obscured unless the current design element is transparent (this is explained below in relation to the render stage).

Where one or more static elements has been added to a layer the layer is referred to as a static layer. Where a dynamic element has been added to a layer the layer is referred to as a dynamic layer.

Following 314, the renderer module 114 checks to see if there are further design elements to process. If so, processing proceeds to 318, if not processing proceeds to 320.

At 318, the renderer module 114 increments the current depth variable to reference the next foremost depth held by a design element on the page. Processing then returns to 306 to process that element.

At 320, all design elements have been processed and the layer creation process ends.

It should be noted that in some embodiments, the process 300 can be optimized in ways not described above. For example, if the renderer module 114 alternatively started from the highest depth (front to back), the renderer module may determine that any further design elements can not be visible in the design and therefore do not need to be processed and rendered. That is, if the first design element is a design element that takes up some or all of the visible area in a page, then, if it is entirely non-transparent, any subsequent design elements placed behind the design element will not be seen. This optimization process can be performed even where layers are associated with alpha masks as explained below.

Static Layer Bitmap Creation

As described below, generating output frames requires an image (e.g. bitmap) corresponding to each static layer. Static layer bitmaps can be created at any appropriate time after the static layer has been created.

Creating a static layer bitmap for a given static layer generally involves rasterising the static elements of the layer. Where the static layer has multiple elements that partially or wholly overlap, rasterization takes individual element depths into account so that if one element of the layer occludes or partly occludes another element of that layer this occlusion is reflected in the bitmap generated (and, therefore, image data in respect of the occluded element or part thereof is lost).

Layer Rendering Process

Figure 4:
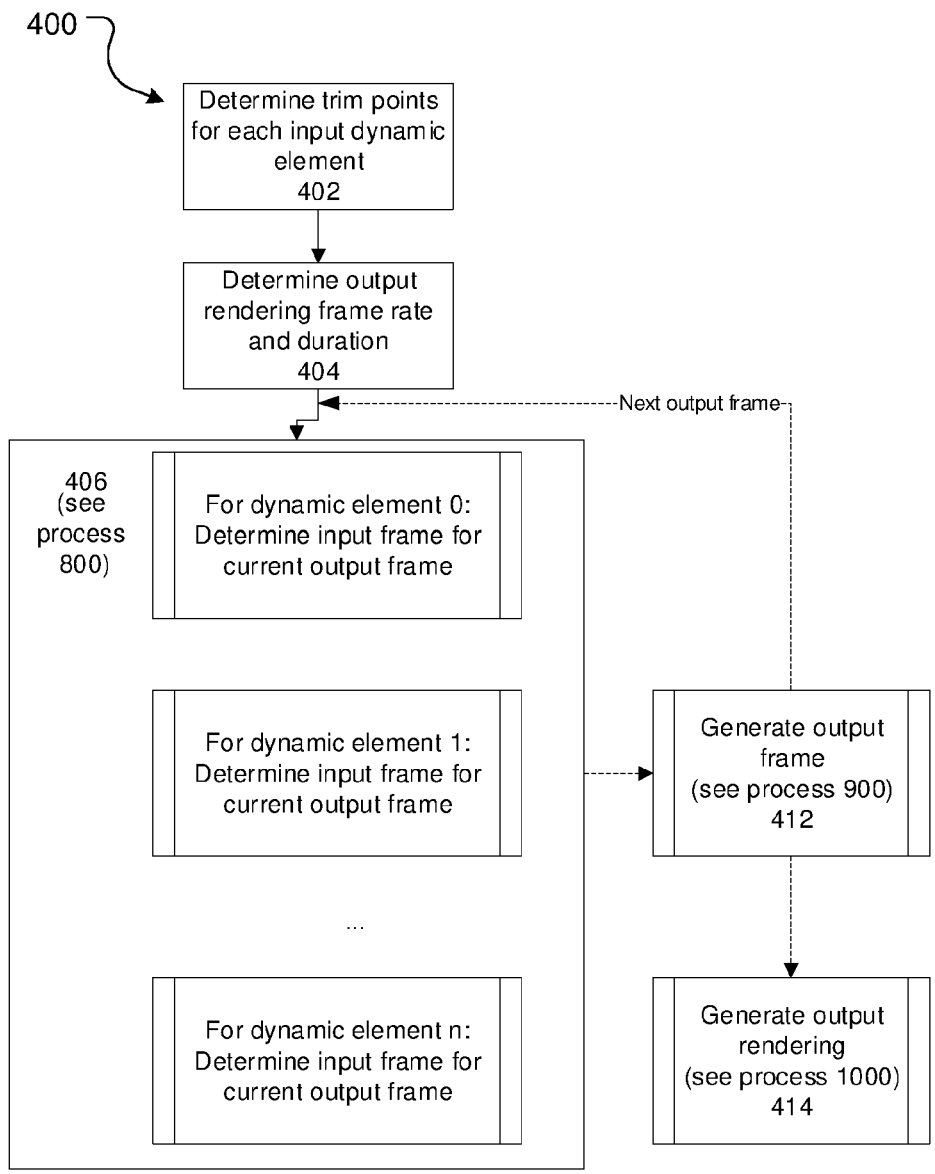
FIG. 4 depicts operations involved in rendering a document with dynamic design elements.

Once the layers for a page have been constructed (e.g. per process 300 described above) those layers can be used to render the design page according to process 400 as illustrated in FIG. 4. As with the layer construction process, rendering process is performed on a page-by-page basis.

It should be noted that in some cases there may be no dynamic elements to render. However, for the illustrative examples below it can be assumed that the renderer module 114 is rendering at least one dynamic element. For the purposes of the description below, the letter 'n' represents the number of input dynamic elements minus 1 (as counting input dynamic elements typically begins from 0).

Typically an input dynamic element will be a video—e.g. a mp4 or other video format file. More generally, the techniques described can be used (or be adapted to be used) for any type of dynamic element that can be decoded/broken up into two or more frames.

Initially, terminology used in the layer rendering process will be described.

The layer rendering process described herein is a pipeline involving: application->geometry->rasterization->encoding.

In order to not encode a scene that is in the process of rendering, double buffering is used. This involves the GPU rendering into a second buffer and swapping that buffer with the one the encoder step is using once the rendering of the entire frame is complete.

The application phase of the pipeline involves operations performed using the CPU. These operations include, for example, calculating various matrices, loading textures, submitting vertices to the GPU (via the GPU API) and setting configuration values in vertex and fragment shading processes that, for example, can be used for filtering of video frames (e.g. to adjust brightness).

The geometry phase of the pipeline involves arranging vertices and performing vertex shading. Vertex shading is performed by a vertex shader, a program that uses vertices and a MVP matrix to position those vertices in the graphic scene. The vertex shader also uses the texture matrix to determine the texture coordinates used in the reasterization phase of the rendering pipeline.

A MVP (Model View Projection) matrix is a matrix used to determine where vertices are positioned and how they are projected onto a screen.

The rasterization phase of the pipeline involves overlaying each of the rectangle vertices with a mesh and creating fragments.

A fragment will typically correspond to a pixel. For each fragment, a fragment shader is executed (though this can be optimised so that the fragment shader is not run for a fragment that will not be visible). The fragment shader is a program that uses texture coordinates and a texture to determine a given output pixel. Filters and alpha masks are applied by the fragment shader during fragment shading. Multiple fragments can contribute to the same pixel in an output frame (or, more precisely, in the render buffer). The precise manner in which a fragment is combined with an existing pixel can be configured, allowing for pixels of semitransparent videos to be created, overlaying the pixels of whatever layer is below.

Generally speaking, the presently described process for rendering a page with dynamic elements involves generating a stream of output frames which are encoded into an output rendering (e.g. a video).

To generate individual output frames, each dynamic element is decoded to generate a stream of input frames. Each frame in the stream of input frames is analysed to determine whether it is eligible for inclusion in the output frame currently being generated or not, with eligible frames made available to the process that renders the output frames. For a given output frame, once eligible frames from all dynamic elements have been made available they are combined (together with any alpha masks and static layer images), the resulting combination then rendered into the output frame.

As the rendering process proceeds, the stream of output frames is encoded into the output rendering.

Process 400 begins by determining 402 any trim points for each input dynamic element (noting trim points may not be defined). In some embodiments, any trim points can be retrieved from the metadata of the input dynamic element.

At 404, the renderer module 114 determines an output frame rate—i.e. the frame rate for the output rendering. Different input dynamic elements may have different frame rates (measured in frames per second or fps), and/or a given dynamic element may have a variable frame rate. In some examples, each of the dynamic elements have the same frame rate, so each frame corresponds to the same period of time. In other examples, the frame rates of the dynamic elements are different.

Where the output frame rate is higher than the frame rate of a dynamic element, the dynamic element will not have enough frames to fill out the output rendering. In this case frames of the lower frame rate dynamic element can be duplicated as needed to fill up the frame rate for the output rendering.

For example, if the output frame rate is 60 fps and a 30 fps input dynamic element is being processed, processing the 30 fps input may involve duplicating every frame.

Conversely, the output frame rate may be higher than the frame rate of a dynamic element, in which case the dynamic element will have too many frames for the output rendering. In this case frames of the higher frame rate dynamic element can be omitted.

For example, if the output frame rate is 30 fps and a 60 fps input dynamic element is being processed, processing the 60 fps input may involve omitting every second frame.

The renderer module 114 can be configured to determine the output frame rate in various ways. For example, the renderer module 114 may determine the output frame rate to be: the same as the frame rate of the input video with the highest frame rate; the same as the frame rate of the input video with the lowest frame rate; a user defined frame rate; a frame rate based on rendering parameters (e.g. by associating particular frame rates with particular output formats and/or the type of device the rendering is for); a predefined constant/default frame rate (e.g. 30 fps, 60 fps, or other frame rate).

At 404, the renderer module 114 also determines a duration of the output rendering. Various approaches may be adopted, but in the present example the renderer module 114 is configured to set the output duration to be the duration of the longest input dynamic element (taking into account any trim points). E.g. if the longest input dynamic element is a 4 minute video (with no trim points), the output duration will be 4 minutes.

Once determined, the renderer module 114 can use the output frame rate and output duration to determine the number of output frames required. Specifically, the number of output frames=output frame rate (in fps)*output duration (in s).

Once the trim points, output frame rate, and output duration have been determined the rendering pipeline commences.

In order to render a single given output frame, an input frame from each of the input dynamic elements is required. At 406, therefore, the renderer module 114 decodes each dynamic element into a stream of input frames (one stream per input dynamic element). The frames of each input frame stream are analysed to determine an eligible input frame for a particular output frame. This involves processing each input dynamic element separately, which is described in detail below with reference to process 800 of FIG. 8.

Once the dynamic element input frames for a given output frame have been determined (one for each dynamic element), the renderer module 114 uses these (together with alpha masks and static design elements) to render 412 one output frame. Rendering an output frame is described in more detail below with reference to process 900 of FIG. 9.

Processes 800 and 900 generate a stream of output frames which the renderer module 114 uses to generate the output rendering—e.g. an output video. This involves encoding the output frames and, where audio is involved, multiplexing with the audio. This is described below in process 1000 of FIG. 10.

Once the output rendering has been has been generated, it can used in various ways. For example, the output rendering can be displayed (by playing the output rendering); stored on the client system 102 (e.g. saved to locally accessible memory); and/or shared (e.g. by email, message service, communication to other client systems, uploading to other servers).

Example Design with Layers

An example design document 500 is illustrated in FIG. 5. The example document comprises a single page with a background 502. The page also comprises multiple design elements: 504, 506, 508, 510 and 512.

Working rearmost to foremost: design element 502 (e.g. z-index=0) is a static background element; design element 504 (e.g. z-index=1) is a partly transparent video (i.e. a dynamic element). Design element 506 (e.g. z-index=2) is an opaque shape (static element) which is a simple rectangle. Placed in front of, or on top of this shape is an opaque shape (static element) in the form of a star 508 (e.g. z-index=3) and an opaque shape (static element) in the form of a circle 510 (e.g. z-index=4). At the very front is a partly transparent video (dynamic element) in the shape of an ellipse 512 (e.g. z-index=5).

FIG. 6 is a corresponding profile view of the document illustrated in FIG. 5. This profile view illustrates the layers that are created by process 300. The arrow represents the viewing location and direction of the viewer and therefore indicates how the depth of the design elements can be calculated. Working rearmost to foremost: layer 602 (e.g. layer depth=0) is the furthest away and includes the static design element 502 (which is the background of the page); layer 604 is in front of that (e.g. layer depth=1) and includes the dynamic design element 504; layer 606 is next (e.g. layer depth=2) includes the opaque shape 506, the star shaped design element 508 and the circle shaped design element 510. Layer 608 (e.g. layer depth=3) includes the dynamic design element 512.

FIG. 7 is an example of an alpha mask and illustrates how the alpha mask of the dynamic design element 512 can be determined. In this case the visible or partly transparent oval 702 corresponds to the same shape as the design element 512. The original video is of the size indicated by the rectangle 704. In this example, all of the video except for the oval shape 702 is black so is fully transparent and therefore is not visible. The oval shape 702 is grey—indicating part transparency—so design elements in layers below the dynamic design element 512 will also be visible. In the example of FIG. 5, the rectangle design element 506 and star 508 will be visible under each of the frames of the video in 512.

Scene Preparation

In order to prepare for rendering a page, the rendering module performs various operations. These operations can be performed at any appropriate time after layers have been generated and (typically) before decoding of input dynamic elements (808 of FIG. 8 described below) commences.

As art of the scene preparation the renderer module 114 instantiates a graphic scene.

For each layer generated in the layer creation process, the renderer module 114 defines a corresponding rectangle in the scene. Each rectangle is defined by four sets of coordinates in the same plane (each set of coordinates indicating a corner of the rectangle). For a rectangle corresponding to a particular layer, the sets of coordinates are based on the x-y coordinates of the element(s) in the layer corresponding to that vertex. This can be achieved in various ways, for example by (for each rectangle) initially writing the rectangle as a 1×1 square at the origin (0/0/0) then stretching/moving the rectangle using the MVP matrix.

The renderer module 114 also defines a camera position for the scene.

For each static layer bitmap (described above) the renderer module 114 creates a corresponding texture and loads the static layer bitmap into that texture. As static layers do not change over time, the texture for a given static layer is used for all output frames.

For each dynamic layer that does not have transparency (i.e. a dynamic layer that is associated with a dynamic design element that does not have transparency), the renderer module 114 creates an input frame texture. For each dynamic layer that does have transparency (i.e. a dynamic layer that is associated with a dynamic design element that does have transparency), the renderer module 114 creates two textures: an alpha mask texture and an input frame texture. In either case, no texture is loaded into the input frame texture for a dynamic layer at this point (this occurs downstream once the relevant input frame from the dynamic element associated with the dynamic layer has been determined). If an alpha mask texture is created for a dynamic layer, the renderer module 114 loads the alpha mask for the dynamic layer into the alpha mask texture (generating the alpha mask before doing so if that has not already been done).

With reference to the OpenGL API: the glGenTextures function can be used to generate a texture; the glBindTexture function can be used to associate a texture with a scene; the glTexParameter function can be used to configure various behaviours (e.g. what should happen when the texture is smaller than the vertices it's drawn onto); the glTexlmage2D function can be used to prepare the texture for the bitmap to be loaded; and the glTexSublmage2D function can be used to load the bitmap to into the texture; the glViewport function can be used to configure the viewport the camera will be seeing.

Dynamic Element Decoding and Input Frame Selection

Figure 8:
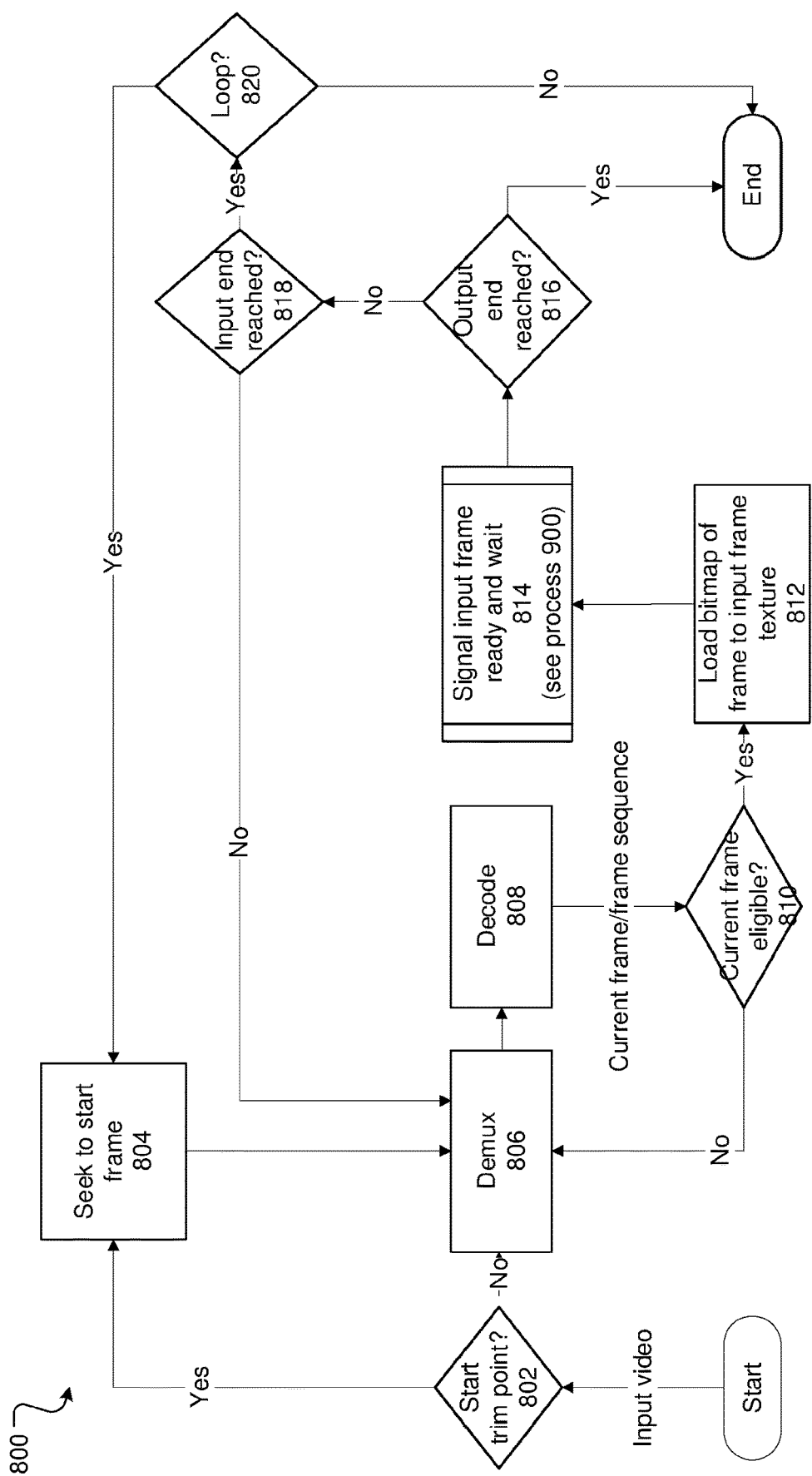
FIG. 8 depicts an example process for selecting input frames from a dynamic design element for inclusion in an output frame.

FIG. 8 illustrates a process 800 for decoding a given dynamic element into a stream of input frames (which will be referred to as an input stream) and determining which input frames from the stream are to be used in the output rendering. As discussed in relation to FIG. 4, each input dynamic element is separately processed in accordance with process 800.

Step 802 is an initial step to determine if the dynamic element being processed has a start trim point. If not processing continues to 806 (deplutiplexing).

If a start trim point is defined for the dynamic element, at 804 the renderer module 114 seeks to the start frame for the dynamic element. To do so, the renderer module 114 initially seeks to the frame defined by the start trim point. In many video compression algorithms frames of a video can be either an I-frame (intra-coded picture) or a P-frame (predicted picture). For dynamic elements that include I- and P-frames, if the frame defined by a start trim point is an I-frame the renderer module 114 determines this frame to be the starting frame of the input dynamic element. If, however, the first frame defined by the trim point is a P-frame, the renderer module 114 seeks to the first I-frame before the frame defined by the start trim point and determines that I-frame to be the starting frame.

At step 806 demultiplexing occurs. This involves separating visual (e.g. video) data of the input dynamic element from audio data. The visual data is processed in accordance with the process 800. The audio data is stored for later multiplexing into the output rendering (see process 1000).

Once demultiplexing has occurred, decoding 808 of the input dynamic element commences. Decoding generates a stream of input frames, each input frame in the stream having an associated timestamp. Typically, the decoding step will decode a frame sequence of at least the current frame and the next frame, which is used to determine if the current frame is eligible for inclusion in the output frame.

In certain implementations, the renderer module 114 causes decoding to be performed by the GPU (or other specialised encode/decode hardware). For example, the A13 graphics card of iPhone 11 mobile devices has a dedicated codec chip for H.264 and H.265 decoding/encoding. To cause decoding to be performed by this chip the renderer module 114 instructs the operating system 103 to perform decoding (the operating system, in turn, invoking the codec chip).

At 810, the renderer module 114 analyses the stream of input frames to determine a frame that is eligible to be used in the current output frame being prepared. This involves analysing each frame in the input stream to determine if it is an eligible frame for the current point of the output rendering. In the present implementation, frame eligibility for a given frame is determined by the following steps:

1. Checking that the current input frame timestamp is greater than or equal to the start trim point (noting that the start trim point may be the beginning of the input if not defined). If not, the frame is determined to be ineligible and the next frame from the input stream is considered for eligibility.
2. If the current input frame timestamp is greater than or equal to the start trim point:
   a. determining a timestamp of the next input frame.
   b. determining a target output timestamp (based, for example, on the output frame rate and the output frame currently being processed); and
   c. determining the current input frame to be:
      eligible if the target output timestamp is greater than the timestamp of the current input frame and less than the timestamp of the next input frame;
      ineligible otherwise.

If the dynamic element has a start trim point, determining a timestamp of the next input frame takes the start trim into account. Similarly, if one or more loops of the dynamic element have occurred, determining a timestamp of the next input frame takes the number of loops into account.

If the current frame is determined to be ineligible it is disregarded and the next frame from the input stream is considered for eligibility.

If the current frame is determined to be eligible, processing continues to 812. At 812 a bitmap of the eligible frame is loaded into the input frame texture created for the dynamic layer associated with the dynamic element being decoded.

At 814, the process signals that the dynamic element's input frame is ready—i.e. it has been loaded into the appropriate texture and is available for use in rendering in the output frame. The process then waits for the current output frame to be generated before continuing to 816. The output frame generation is described in more detail in process 900 illustrated in FIG. 9.

At 816, once the current output frame has been generated, the renderer module 114 determines if the end of the output rendering has been reached. This determination may be made with respect to time (i.e. whether sufficient frames to fill the output duration given the output frame rate have been generated) or a frame count (based on the total number of frames required for the output rendering). If the end of the output rendering has been reached there is no need to decode any more frames and process 800 ends.

If the end of the output rendering has not been reached, the process proceeds to 818 to determine if the end (or, if defined, end trim point) of the dynamic element has been reached.

If the end or end trim point of the dynamic element has not been reached, the renderer module 114 returns to demultiplexing 806 the input video and repeats 808 to 816 as above.

If the end or end trim point of the input dynamic element has been reached, the renderer module 114 determines if the input dynamic element should loop. In some embodiments, looping is on by default for all input videos shorter than the longest input video. Where looping is off or the renderer module 114 determines that the input video should not loop (for example, the longest input video by default should not loop), the process 800 can end. If looping is off for a given input dynamic element (at 820) but the end of the output has not been reached (at 816) a same frame is generated for that input dynamic element for all remaining output frames. This frame can, for example, be the last eligible frame of the input dynamic element, or be a predefined image (e.g. a black, white, grey, or other colour rectangle/shape).

If the renderer module 114 determines at 818 that the input dynamic element should loop, then the renderer module 114 proceeds to 804 to seek to the start of the video. In this case, determining input frame timestamps takes into account the fact that the input dynamic element has looped (one or more times).

Generating Output Frames

Figure 9:
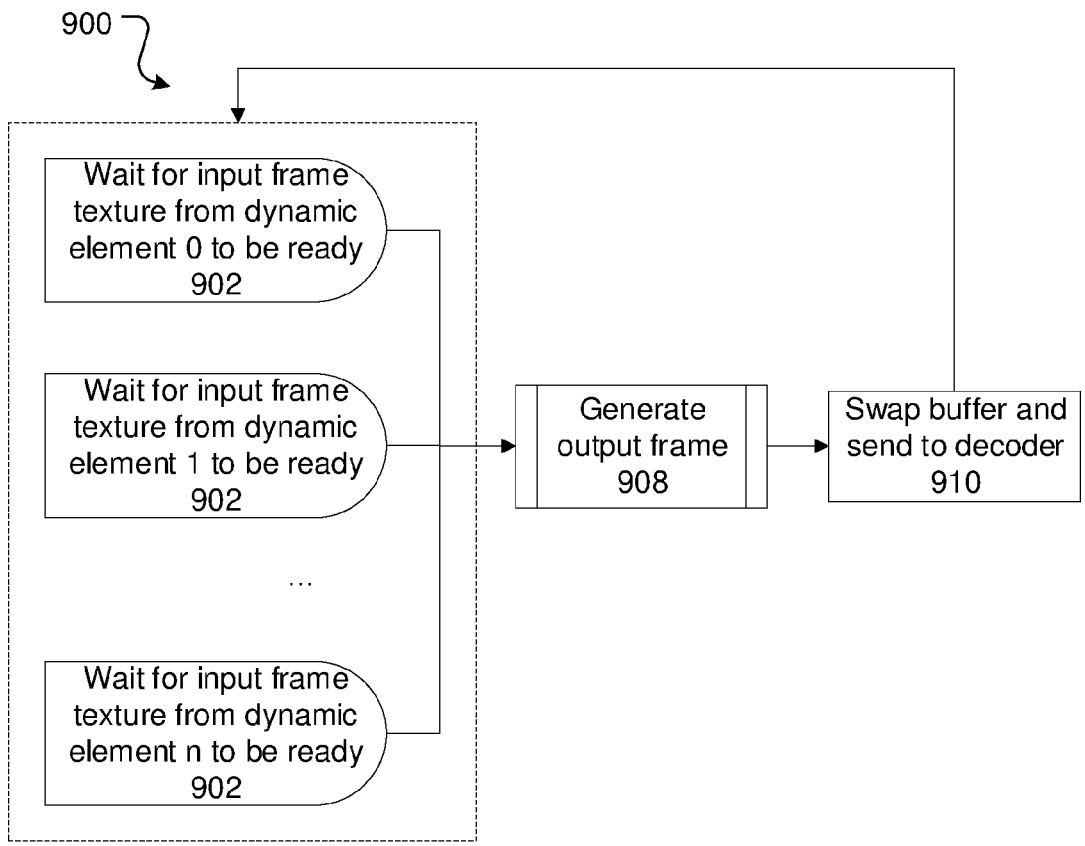
FIG. 9 is an example flowchart for generating an output frame from one or more input frames.

FIG. 9 illustrates an example process 900 for generating a stream of output frames. A given output frame is generated based on eligible input frames from the input dynamic elements (determined at 810 and loaded into textures at 812) and the static layer textures generated for each static layer (described above).

Process 900 operates in conjunction with process 800.

For a given output frame, process 900, waits at 902 for signals indicating that for each dynamic layer an eligible input frame (or a bitmap thereof) has been loaded into the dynamic element texture created for that layer.

At 908, once all dynamic layers input frame textures are loaded, a frame is rendered into the output buffer. This initially involves resetting the buffer to the background colour of the page. Following this, each layer is processed in depth order (rearmost to foremost). For each layer:
a) Vertices of the rectangle corresponding to the layer are drawn (based on the four sets of coordinates for that layer's rectangle described above).
b) The MVP (Model View Projection) matrix, texture matrix and various configurations are updated.
c) The vertex and fragment shader are run.

With reference to the OpenGL API: the glClear function can be used to clear the buffer of the previous colour; the glClearColor function can be used to set the clear colour to the background colour of the page; the glBlendFunc function can be used to control how the output is blended together with existing pixel values; the glViewport function can be used to configure the viewport the camera will be seeing; the glDrawArrays function can be used to draw the rectangle; the glUseProgram can be used to select the vertex and fragment shader programs to be used; the glUniform function can be used to write configuration values; the glVertexAttribPointer function and glEnableVertexAttribArray function can be used to write MVP and texture matrices; the glFinish function can be used to prevent further processing until ready.

At 910, once all layers have been rendered for the output frame in question, the buffer is swapped and sent to the encoder (per double buffering as described above).

With reference to the OpenGL API, the eglSwapBuffers function can be used to swap buffers.

Once the output frame has been sent to the encoder, processing returns to 902 for the next output frame. Using processes 800 and 900 the renderer module 114 generates all output frames required for the output rendering.

Encoding the Output Rendering

Figure 10:
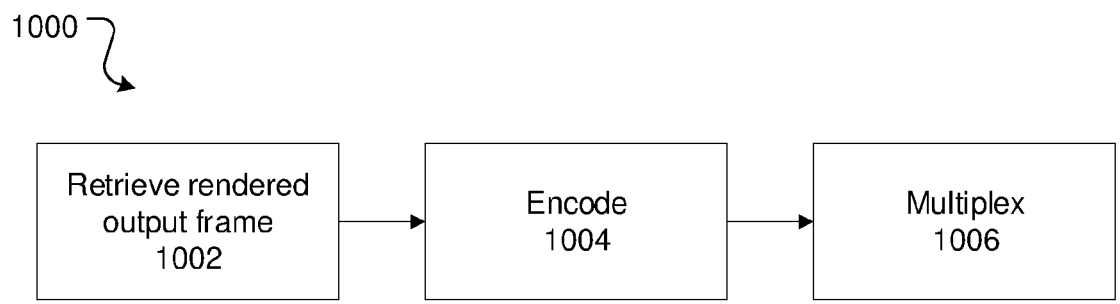
FIG. 10 is an example flowchart for rendering a design using one or more output frames.

FIG. 10 illustrates an example process 1000 for encoding output frames to an output rendering (e.g. a video).

At 1002, the renderer module 114 receives an output frame from process 900.

At 1004, the output frame is encoded into an output rendering. The particular encoding used depends on the format of the output rendering and the video compression algorithm used. Typically, encode process 1004 requires a pipeline of output frames. Where this is the case, encoding at 1004 will only commence once this pipeline is available.

As with the decoding of dynamic input elements described above, in certain implementations encoding is performed using specialised encode/decode hardware.

Subsequent to encoding, the output rendering can be multiplexed 1006 with any audio. If there is only one audio source on the page, this is relatively simple in that the input audio can essentially be replicated directly when multiplexing. Noting that this accounts for any changes in the audio timestamps caused by a difference in frame rates between the audio source from an input video and output video.

However, audio from multiple sources on a page can be more complex. For example, if there are two videos with audio on the page, then the audio for one can be replicated when multiplexing, but at the loss of the audio of the second video. An alternative is to mix the audio for the two videos together, and multiplex this combined audio together with the video.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for rendering a page into an output video, the page comprising a plurality of design elements, each design element being a static design element or a dynamic design element, the method comprising:
processing the page to generate a plurality of layers, the plurality of layers including:
one or more static layers, each static layer being associated with one or more static design elements of the page; and
one or more dynamic layers, each dynamic layer being associated with a single dynamic design element of the page;
for each static layer, generating a corresponding static layer bitmap;
generating a set of textures, the set of textures comprising:
one or more-static layer textures, each static layer texture corresponding to a static layer and loaded with that static layer's corresponding static layer bitmap; and one or more input frame textures, each input frame texture corresponding to a dynamic layer;

generating a stream of output frames, each output frame in the stream of output frames generated by:
for each dynamic layer:
determining an eligible input frame from the dynamic element associated with the dynamic layer; and
loading the eligible input frame into the input frame texture corresponding to the dynamic layer;
rendering the set of textures to generate the output frame; and encoding the stream of output frames into the output video.

2. The computer implemented method of claim 1, wherein processing the page to generate the plurality of layers comprises:
analysing each design element of the page and, for a given design element:
determining whether the given design element is a static design element or a dynamic design element; and
in response to determining that the given design element is a dynamic design element:
creating a new dynamic layer for the given design element; and
associating the given design element with the dynamic layer created.

3. The computer implemented method of claim 1, wherein processing the page to generate one or more layers comprises:
analysing each design element of the page and, for a given design element:
determining whether the given design element is a static design element or a dynamic design element; and
in response to determining that the given design element is a static design element:
determining if a previously analysed design element was a static design element; and
in response to determining a previously analysed design element was a static design element, adding the given design element to a same layer the previously analysed static design element was added to.

4. The computer implemented method of claim 3, wherein in response to determining that no previously analysed design element exists or that the previously analysed design element was a dynamic design element, creating a new static layer for the particular design element and associating the particular design element with the static layer created.

5. The computer implemented method of claim 2, wherein analysing each design element of the page comprises analysing each design element of the page in a depth order from a rearmost design element to a foremost design element.

6. The computer implemented method of claim 1, wherein:
the set of textures further comprises one or more alpha mask textures, each alpha mask texture corresponding to a dynamic layer with transparency.

7. The computer implemented method of claim 1, wherein for a particular output frame and a particular dynamic layer, determining the eligible input frame from the dynamic element associated with the particular dynamic layer comprises:
decoding the dynamic element associated with the particular dynamic layer into a stream of input frames; and
determining the eligible input frame from the stream of input frames.

8. The computer implemented method of claim 7, wherein determining -the eligible input frame from the stream of input frames comprises:
determining a target timestamp of the particular output frame;
determining an input stream frame timestamp associated with the input stream frame; and
determining the eligible input frame based on the target timestamp and input stream frame timestamp.

9. The computer implemented method of claim 1, wherein multiple static design elements in consecutive depth order are associated with a same static layer.

10. The computer implemented method claim 1, wherein generating a particular corresponding static layer bitmap that corresponds to a particular static layer comprises rasterising the one or more static design elements associated with the particular static layer.

11. A computer processing system comprising:
a processing unit;
a communication interface; and
non-transient computer-readable storage medium storing sequences of instructions which, when executed by the processing unit, cause computer processing system to perform a method comprising:
processing a page to generate a plurality of layers, the page comprising a plurality of design elements, each design element being a static design element or a dynamic design element, the plurality of layers including:
one or more static layers, each static layer being associated with one or more static design elements of the page; and
one or more dynamic layers, each dynamic layer being associated with a single dynamic design element of the page;
for each static layer, generating a corresponding static layer bitmap;
generating a set of textures, the set of textures comprising:
one or more-static layer textures, each static layer texture corresponding to a static layer and loaded with that static layer's corresponding static layer bitmap; and
one or more input frame textures, each input frame texture corresponding to a dynamic layer;
generating a stream of output frames, each output frame in the stream of output frames generated by:
for each dynamic layer:
determining an eligible input frame from the dynamic element associated with the dynamic layer; and
loading the eligible input frame into the input frame texture corresponding to the dynamic layer;
rendering the set of textures to generate the output frame; and
encoding the stream of output frames into the output video.

12. The computer processing system of claim 11, wherein processing the page to generate the plurality of layers comprises:
analysing each design element of the page and, for a given design element:

determining whether the given design element is a static design element or a dynamic design element; and in response to determining that the given design element is a dynamic design element:
creating a new dynamic layer for the given design element; and
associating the given design element with the dynamic layer created.

13. The computer processing system of claim 11, wherein processing the page to generate the plurality of layers comprises:
analysing each design element of the page and, for a given design element:
determining whether the given design element is a static design element or a dynamic design element; and
in response to determining that the given design element is a static design element:
determining if a previously analysed design element was a static design element; and
in response to determining a previously analysed design element was a static design element, adding the given design element to a same layer the previously analysed static design element was added to.

14. The computer processing system of claim 13, wherein in response to determining that no previously analysed design element exists or that the previously analysed design element was a dynamic design element, the method further comprises creating a new static layer for the particular design element and associating the particular design element with the static layer created.

15. The computer processing system of claim 12, wherein analysing each design element of the page comprises analysing each design element of the page in a depth order from a rearmost design element to a foremost design element.

16. The computer processing system of claim 11, wherein:
the set of textures further comprises one or more alpha mask textures, each alpha mask texture corresponding to a dynamic layer with transparency.

17. The computer processing system of claim 11, wherein for a particular output frame and a particular dynamic layer, determining the eligible input frame from the dynamic element associated with the particular dynamic layer comprises:
decoding the dynamic element associated with the particular dynamic layer into a stream of input frames; and
determining the eligible input frame from the stream of input frames.

18. The computer processing system of claim 17, wherein determining the eligible input frame from the stream of input frames comprises:
determining a target timestamp of the particular output frame;
determining an input stream frame timestamp associated with the input stream frame; and
determining the eligible input frame from the stream of input frames based on the target timestamp and input stream frame timestamp.

19. The computer processing system of claim 11, wherein multiple static design elements in consecutive depth order are associated with a same static layer.

20. Non-transient storage medium readable by one or more processors, the storage medium storing instructions executable by one or more processors to cause the one or more processors to perform a method comprising:
processing a page to generate a plurality of layers, the page comprising a plurality of design elements, each design element being a static design element or a dynamic design element, the plurality of layers including:
one or more static layers, each static layer being associated with one or more static design elements of the page; and
one or more dynamic layers, each dynamic layer being associated with a single dynamic design element of the page;
for each static layer, generating a corresponding static layer bitmap;
generating a set of textures, the set of textures comprising:
one or more-static layer textures, each static layer texture corresponding to a static layer and loaded with that static layer's corresponding static layer bitmap; and
one or more input frame textures, each input frame texture corresponding to a dynamic layer;
generating a stream of output frames, each output frame in the stream of output frames generated by:
for each dynamic layer:
determining an eligible input frame from the dynamic element associated with the dynamic layer; and
loading the eligible input frame into the input frame texture corresponding to the dynamic layer;
rendering the set of textures to generate the output frame; and
encoding the stream of output frames into the output video.

* * * * *